(12) United States Patent
Weiss et al.

(10) Patent No.: US 6,194,538 B1
(45) Date of Patent: Feb. 27, 2001

(54) PROCESS FOR PRODUCING POLYAMIDES FROM AMINONITRILES

(75) Inventors: Robert Weiss, Kirchheim; Dieter Krauss; Dieter Keller, both of Grünstadt; Gunter Pipper, Bad Dürkheim; Wolfgang Harder, Weinheim; Alfons Ludwig, Höxter; Ralf Mohrschladt, Schwetzingen, all of (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 09/242,714
(22) PCT Filed: Aug. 26, 1997
(86) PCT No.: PCT/EP97/04640
§ 371 Date: Feb. 22, 1999
§ 102(e) Date: Feb. 22, 1999
(87) PCT Pub. No.: WO98/08889
PCT Pub. Date: Mar. 5, 1998

(30) Foreign Application Priority Data

Aug. 30, 1996 (DE) .............................. 196 35 077
Mar. 7, 1997 (DE) .............................. 197 09 390

(51) Int. Cl.$^7$ .......................... C08G 69/04; C08G 69/26; C08G 69/00
(52) U.S. Cl. .......................... 528/310; 528/322; 528/323; 528/324; 528/329.1; 528/331; 528/332; 528/336; 528/347
(58) Field of Search ..................... 528/310, 323, 528/322, 332, 329.1, 324, 347

(56) References Cited

U.S. PATENT DOCUMENTS

| 2,245,129 | | 6/1941 | Greenewalt | 528/310 |
|---|---|---|---|---|
| 4,568,736 | * | 2/1986 | Curatolo et al. | 528/313 |
| 4,629,776 | * | 12/1986 | Curatolo et al. | 528/313 |
| 5,109,104 | * | 4/1992 | Marks | 528/313 |
| 5,185,427 | * | 2/1993 | Marks | 528/329.1 |
| 5,310,827 | * | 5/1994 | Komiya et al. | 525/439 |
| 5,723,603 | * | 3/1998 | Gilbert et al. | 540/539 |

FOREIGN PATENT DOCUMENTS

| 35 34 817 | 4/1987 | (DE) . |
|---|---|---|
| 65 291 | 11/1982 | (EP) . |
| 479 306 | 4/1992 | (EP) . |

* cited by examiner

*Primary Examiner*—P. Hampton-Hightower
(74) *Attorney, Agent, or Firm*—Keil & Weinkauf

(57) ABSTRACT

A process for preparing a polyamide by reacting at least one aminonitrile with water comprises:

(1) reacting at least one aminonitrile with water at a temperature from 100 to 360° C. and a pressure from 0.1 to $35 \times 10^6$ Pa to obtain a reaction mixture, (2) further reacting the reaction mixture at a temperature from 150 to 400° C. and a pressure which is lower than the pressure in step 1, the temperature and the pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and (3) admixing the first liquid or the first solid phase or the mixture of first liquid and first solid phase with a gaseous or liquid phase comprising water at a temperature from 150 to 360° C. and a pressure from 0.1 to $30 \times 10^6$ Pa to obtain a product mixture.

26 Claims, No Drawings

PROCESS FOR PRODUCING POLYAMIDES FROM AMINONITRILES

TECHNICAL FIELD

The present invention relates to a novel process for preparing polyamides from aminonitriles and water at elevated temperature and elevated pressure.

BACKGROUND OF INVENTION

U.S. Pat. No. 2,245,129 describes a batchwise two-step preparation of polycaprolactam from ω-aminocapronitrile ("ACN") and water at a temperature within the range from 150 to 300° C., governed by a specific temperature program as a function of the amount of water added, and a pressure of not more than 30 bar. The disadvantages of this process are the long reaction times (20 h in step 1), the low viscosity of the resulting polycaproplactam and the high level of volatile bases (essentially primary acid amides) compared with a polycaprolactam prepared from caprolactam.

DE-C 35 34 817, U.S. Pat. Nos. 4,568,736 and 4,629,776 partly solve the problems described in U.S. Pat. No. 2,245,129 by the use of phosphorus- and sulfur-containing catalysts. The use of the catalysts mentioned improves the low space-time yield of the process described in U.S. Pat. No. 2,245,129. However, the level of volatile bases in all the products prepared by the abovementioned processes is still too high, so that the polyamides are difficult to process and have a reduced carboxyl end group number. The stoichiometric discrepancy between the amino and carboxyl end groups in the products of the abovementioned processes is responsible for their showing an insufficient degree of polymerization and a slow increase in molecular weight during tempering. Furthermore, complete removal of the catalysts is virtually impossible, so that the chemical and physical behavior of the polymers prepared using the catalysts, such as type and quantity of end groups or snap-off behavior during spinning, is adversely affected.

EP-A 479 306 proposes, in relation to the reaction of ACN with water to give polycaprolactam, to remove ammonia and water continuously, by decompressing, once a reaction temperature from 200 to 260° C. has been attained and at the same time to add water continuously while selecting a pressure within the range from 14 to $24 \times 10^6$ Pa (14 to 24 bar).

EP-A 65 291 describes a continuous process for preparing nylon-6,6 from dinitriles and diamines. Molecular weight building takes place by polycondensation.

Caprolactam is not produced as an intermediate, which it is in the polymerization of ACN. Thus, because the reactions are different, the process of EP-A 65 291 is not applicable to the present problem.

It is an object of the present invention to provide a process for preparing polyamides from aminonitriles with improved hydrolysis of the reactants, especially of the acid amide groups, and thus a higher carboxyl end group content. The molecular weight increase during the polymerization and the temperability of the product are improved in this way, compared with prior art processes.

We have found that this object is achieved by a process for preparing a polyamide by reaction of at least one aminonitrile with water, which comprises:

(1) reacting at least one aminonitrile with water at a temperature from 100 to 360° C. and a pressure from 0.1 to $35 \times 10^6$ Pa to obtain a reaction mixture, (2) further reacting the reaction mixture at a temperature from 150 to 400° C. and a pressure which is lower than the pressure in step 1, the temperature and the pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and (3) admixing the first liquid or the first solid phase or the mixture of first liquid and first solid phase with a gaseous or liquid phase comprising water at a temperature from 150 to 360° C. and a pressure from 0.1 to $30 \times 10^6$ Pa to obtain a product mixture.

The present invention further provides a process for preparing a polyamide by reaction of at least one aminonitrile with water, which comprises:

(1) reacting at least one aminonitrile with water at a temperature from 100 to 360° C. and a pressure from 0.1 to $35 \times 10^6$ Pa to obtain a reaction mixture, (2) further reacting the reaction mixture at a temperature from 150 to 400° C. and a pressure which is lower than the pressure in step 1, the temperature and the pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and (3) admixing the first liquid or the first solid phase or the mixture of first liquid and first solid phase with a gaseous or liquid phase comprising water at a temperature from 150 to 360° C. and a pressure from 0.1 to $30 \times 10^6$ Pa to obtain a product mixture, (4) postcondensing the product mixture at a temperature from 200 to 350° C. and a pressure which is lower than the pressure of step 3, the temperature and pressure being selected so as to obtain a second, water- and ammonia-comprising gas phase and a second liquid or second solid phase or a mixture of second liquid and second solid phase, which each comprise the polyamide.

The present invention further provides a process for preparing a polyamide by reaction of at least one aminonitrile with water, which comprises:

(1) reacting at least one aminonitrile with water at a temperature from 100 to 360° C. and a pressure from 0.1 to $35 \times 10^6$ Pa to obtain a reaction mixture, (2) further reacting the reaction mixture at a temperature from 150 to 400° C. and a pressure which is lower than the pressure in step 1, the temperature and the pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and (4) postcondensing the first liquid or first solid phase or the mixture of first liquid and first solid phase at a temperature from 200 to 350° C. and a pressure which is lower than the pressure of step 3, the temperature and pressure being selected so as to obtain a second, water- and ammonia-comprising gas phase and a second liquid or second solid phase or a mixture of second liquid and second solid phase, which each comprise the polyamide.

The aminonitrile can be in principle any aminonitrile, ie., any compound having both at least one amino group and at least one nitrile group. ω-Aminonitriles are preferred, especially ω-aminoalkyl nitrites having from 4 to 12 carbon atoms, more preferably from 4 to 9 carbon atoms, in the alkylene moiety, or aminoalkylaryl nitriles having from 8 to 13 carbon atoms, preferred aminoalkylaryl nitriles being aminoalkylaryl nitriles which have an alkyl spacer of at least one carbon atom between the aromatic unit and the amino and nitrile group. Especially preferred aminoalkylaryl nitriles are those which have the amino group and nitrile group in the 1,4 position relative to each other.

The ω-aminoalkyl nitrile used is preferably a linear ω-aminoalkyl nitrile in which the alkylene moiety (—$CH_2$—) preferably contains from 4 to 12 carbon atoms, more preferably from 4 to 9 carbon atoms, such as 6-amino-1-cyanopentane (6-aminocapronitrile), 7-amino-1-cyanohexane, 8-amino-1-cyanoheptane, 9-amino-1-cyanooctane, 10-amino-1-cyanononane, particularly preferably 6-aminocapronitrile.

6-Aminocapronitrile is customarily obtained by hydrogenation of adiponitrile according to known methods, described for example in DE-A 836,938, DE-A 848,654 or U.S. Pat. No. 5,151,543.

Of course, it is also possible to use mixtures of a plurality of aminonitriles or mixtures of an aminonitrile with further comonomers, for example caprolactam or the below-defined mixture.

In a particular embodiment, especially if copolyamides are to be prepared, the following mixture is used instead of pure 6-aminocapronitrile:

from 50 to 99.9, preferably from 80 to 90, % by weight of 6-aminocapronitrile, from 0.01 to 50, preferably from 1 to 30, % by weight of at least one dicarboxylic acid selected from the group consisting of aliphatic $C_4$–$C_{10}$-α-ω-dicarboxylic acids, aromatic $C_8$–$C_{12}$-dicarboxylic acids and $C_5$–$C_8$-cycloalkanedicarboxylic acids, from 0 to 50, preferably from 0.1 to 30, % by weight of an α,ω-diamine having from 4 to 10 carbon atoms, from 0 to 50, preferably from 0 to 30, % by weight of an α,ω-$C_2$–$C_{12}$-dinitrile, and from 0 to 50, preferably from 0 to 30, % by weight of an α,ω-$C_5$–$C_{12}$-amino acid or of the corresponding lactam, the individual weight percentages adding up to 100%.

Suitable dicarboxylic acids include aliphatic $C_4$–$C_{10}$-α,ω-dicarboxylic acids such as succinic acid, glutaric acid, adipic acid, pimelic acid, suberic acid, azelaic acid, sebacic acid, preferably adipic acid and sebacic acid, particularly preferably adipic acid, and aromatic $C_8$–$C_{12}$-dicarboxylic acids such as terephthalic acid and also $C_5$–$C_8$-cycloalkanedicarboxylic acids such as cyclohexanedicarboxylic acid.

Suitable α,ω-diamines having from 4 to 10 carbon atoms include tetramethylenediamine, pentamethylenediamine, hexamethylenediamine, heptamethylenediamine, octamethylenediamine, nonamethylenediamine and decamethylenediamine, preferably hexamethylenediamine.

It is further also possible to use salts of the aforementioned dicarboxylic acids and diamines, especially the salt of adipic acid and hexamethylenediamine, which is known as 66 salt.

The α,ω-$C_2$–$C_{12}$-dinitrile used is preferably an aliphatic dinitrile such as 1,4-dicyanobutane (adiponitrile), 1,5-dicyanopentane, 1,6-dicyanohexane, 1,7-dicyanoheptane, 1,8-dicyanooctane, 1,9-dicyanononane, 1,10-dicyanodecane, particularly preferably adiponitrile.

If desired, it is also possible to use diamines, dinitriles and aminonitriles derived from branched alkyls or aryls or alkylaryls.

The α,ω-$C_5$–$C_{12}$-amino acid used can be 5-aminopentanoic acid, 6-aminohexanoic acid, 7-aminoheptanoic acid, 8-aminooctanoic acid, 9-aminononanoic acid, 10-aminodecanoic acid, 11-aminoundecanoic acid or 12-aminododecanoic acid, preferably 6-aminohexanoic acid.

According to the invention, the first step (step 1) involves heating an aminonitrile with water at a temperature from about 100 to about 360° C., preferably about 200 to about 350° C., especially about 250 to about 300° C., to which a pressure from about 0.1 to about 35×10$^6$ Pa, preferably about 4 to about 30×10$^6$ Pa, especially about 6 to about 12×10$^6$ Pa, is set. In this step, the pressure and the temperature can be adjusted relative to each other in such a way as to obtain a liquid or a solid phase and a mixture of liquid or solid phase and a gaseous phase.

According to the invention, water is used in a molar ratio of aminoalkyl nitrile to water within the range 1:1 to 1:30, particularly preferably within the range 1:2 to 1:10, very particularly preferably within the range from 1:2 to 1:4, preference being given to the use of water in excess, based on the aminoalkyl nitrile used.

In this embodiment, the liquid or solid phase or the mixture of liquid and solid phase corresponds to the reaction mixture, whereas the gaseous phase is separated off. As part of this step, the gaseous phase can be separated from the liquid or solid phase or from the mixture of solid or liquid phase at once, or the synthesis mixture forming within this step can be present in two-phase form: liquid/gaseous, solid/gaseous or liquid-solid/gaseous. Of course, the pressure and temperature can also be adjusted relative to each other in such a way that the synthesis mixture is present as a single solid or liquid phase.

The removal of the gas phase can be effected by the use of stirred or unstirred separating vessels or vessel batteries and by the use of evaporator apparatus, for example by means of circulatory evaporators or thin-film evaporators, e.g., film extruders, or by means of annular disk reactors, which ensure an enlarged phase interface. In certain cases, recirculation of the synthesis mixture or the use of a loop reactor may be necessary to increase the phase interface. Furthermore, the removal of the gas phase can be furthered by the addition of water vapor or inert gas into the liquid phase.

Preferably, the pressure is adjusted at a preselected temperature so that the pressure is smaller than the equilibrium vapor pressure of ammonia, but greater than the equilibrium vapor pressure of the other components in the synthesis mixture at the given temperature. This way, it is possible to favor especially the removal of ammonia and thus speed up the hydrolysis of the acid amide groups.

Step 1 can be carried out using stirred vessels, flow pipes or vessel batteries. A two-phase procedure is preferably carried out using vessels or a reaction column, whereas a procedure involving a single liquid phase is preferably carried out using a packed flow tube. The use of a tube bundle reactor, facultatively packed, in the first process step is likewise possible and advantageous for a two-phase procedure especially, to improve the heat transfer and to further reduce the axial back mixing of the reactants.

Usable packing elements include, for example, Raschig rings or Sulzer mixing elements in order that a narrow residence time distribution may be ensured and in order that back mixing may be limited.

In a further embodiment, the reactor of the first step is subjected to a downward flow regime, in which case it is again preferably equipped with packing elements which limit any axial back mixing of the reactants. As a result, the ammonia gas liberated in the reactor, predominantly directly after entry into the reactor, reaches the gas phase at the top of the reactor by the most direct route. Interference caused to the flow profile in the further course of the reactor by ascending gas bubbles or convection is therefore minimal.

As regards the residence time of the synthesis mixture in the first step, there are no restrictions whatsoever; however, it is generally set within the range from about 10 minutes to about 10 hours, preferably within the range from about 30 minutes to about 6 hours.

Although there are no restrictions whatsoever concerning the degree of conversion of nitrile groups in step 1 either, economic reasons especially dictate that the conversion of nitrile groups in step 1 be generally not less than about 70 mol %, preferably at least about 95 mol %, and especially within the range from about 97 to about 99 mol %, based on the moles of aminonitrile used.

The nitrile group conversion is customarily determined by means of IR spectroscopy (CN stretching vibration at 2247 wavenumbers), NMR or HPLC, preferably by IR spectroscopy.

In a further preferred embodiment, the aminonitrile/water mixture is continuously heated with the aid of a heat exchanger and the mixture thus heated is introduced into a reaction vessel heated to the same temperature, preferably into a tube which, if desired, may include internals such as Sulzer mixing elements to avoid back-mixing. Of course, the aminonitrile and the water can also be heated up separately.

Nor does the invention rule out conducting the reaction in step 1 in the presence of oxygen-containing phosphorus compounds, especially phosphoric acid, phosphorous acid and hypophosphorous acid and alkali metal and alkaline earth metal salts and ammonium salts such as $Na_3PO_4$, $NaH_2PO_4$, $Na_2HPO_4$, $NaH_2PO_3$, $Na_2HPO_3$, $NaH_2PO_2$, $K_3PO_4$, $KH_2PO_4$, $K_2HPO_4$, $KH_2PO_3$, $K_2HPO_3$, $KH_2PO_2$, in which case the molar ratio of ω-aminonitrile to phosphorus compounds is selected within the range from 0.01:1 to 1:1, preferably within the range from 0.01:1 to 0.1:1.

Nor does it rule out using known metal oxides, for example titanium dioxides, zirconium oxide, aluminum oxide, lanthanum oxide, magnesium oxide, etc., preferably titanium dioxides, for heterogeneous catalysis in the individual process steps in order that the conversion, especially of the nitrile groups, may be furthered. The abovementioned metal oxides are not used in step 4, but they can be used in steps 1 to 3, in which case the use in step 1 is preferred.

According to the invention, the reaction mixture obtained in the first step is further reacted in step 2 at a temperature from about 150 to about 400° C., preferably at a temperature within the range from about 220 to about 350° C., especially within the range from about 250 to about 290° C., and a pressure which is lower than the pressure in step 1. The pressure in step 2 is preferably at least about $0.5 \times 10^6$ Pa lower than the pressure in step 1, and generally the pressure will be within the range from about 0.05 to about $45 \times 10^6$ Pa, preferably within the range from about 0.5 to about $15 \times 10^6$ Pa, especially within the range from about 0.5 to about $5 \times 10^6$ Pa.

In step 2, the temperature and the pressure are chosen so as to obtain a first gas phase and a first liquid or first solid phase or a mixture of first liquid and first solid phase and the first gas phase is separated from the first liquid or first solid phase or from the mixture of first liquid and first solid phase.

The first gaseous phase, which consists essentially of ammonia and water vapor, is generally removed continuously by means of a distillation apparatus, for example a distillation column. Any organic constituents of the distillate co-removed in the course of this distillation, predominantly unconverted aminonitrile, can be wholly or partly recycled into step 1 and/or step 2.

The residence time of the reaction mixture in step 2 is not subject to any restrictions whatsoever, but is generally within the range from about 10 minutes to about 5 hours, preferably within the range from about 15 minutes to about 4 hours.

The product line between the first and second steps optionally contains packing elements, for example Raschig rings or Sulzer mixing elements, which facilitate a controlled expansion of the reaction mixture into the gas phase.

In step 3, the first liquid or the first solid phase or the mixture of first liquid and first solid phase is admixed with a gaseous or liquid phase comprising water, preferably with water or water vapor. This is preferably done continuously. The amount of water added (as liquid) is preferably within the range from about 50 to about 1500 ml, more preferably within the range from about 100 to about 500 ml, based on 1 kg of the first liquid or first solid phase or of the mixture of first liquid and first solid phase. This addition of water primarily compensates the water losses incurred in step 2 and furthers the hydrolysis of acid amide groups in the synthesis mixture. This results in a further advantage of this invention, that the mixture of the starting materials as used in step 1 can be used with a small excess of water only.

The water-comprising gaseous or liquid phase is preferably preheated in a heat exchanger before being introduced into step 3 and then mixed with the first liquid or the first solid phase or the mixture of first solid and first liquid phase. The reactor may optionally be fitted with mixing elements which further the mixing of the components.

Step 3 is operated at a temperature from 150 to 400° C. and a pressure from 0.1 to $30 \times 10^6$ Pa.

The pressure and temperature can be adjusted to each other in such a way that the synthesis mixture is present as a single liquid or solid phase. In another embodiment, the pressure and temperature are selected so that a liquid or solid phase or a mixture of solid and liquid phase and also a gaseous phase are obtained. In this embodiment, the liquid or solid phase or the mixture of liquid and solid phase corresponds to the product mixture, whereas the gaseous phase is separated off. As part of this step, the gaseous phase can be separated from the liquid or solid phase or from the mixture of solid and liquid phase at once, or the synthesis mixture forming within this step can be present in two-phase form: liquid/gaseous, solid/gaseous or liquid-solid/gaseous.

The pressure can be adjusted at a preselected temperature so that the pressure is smaller than the equilibrium vapor pressure of ammonia, but greater than the equilibrium vapor pressure of the other components in the synthesis mixture at the given temperature. This way, it is possible to favor especially the removal of ammonia and thus speed up the hydrolysis of the acid amide groups.

The apparatus/reactors usable in this step are identical to those of step 1, discussed above.

In a preferred embodiment, the two-phase procedure is carried out by subjecting the reactor of step 1 to downward flow, in which case this reactor is preferably again equipped with packing elements which limit any axial back mixing of the reactants. As a result, the ammonia gas liberated in the reactor, predominantly directly after entry into the reactor, reaches the gas phase at the top of the reactor by the most direct route. Interference caused to the flow profile in the further course of the reactor by ascending gas bubbles or convection is therefore minimal.

The residence time of this step is likewise not subject to any restrictions, but economic reasons generally dictate a range from about 10 minutes to about 3 hours, preferably about 20 to about 90 minutes.

The product mixture obtained in step 3 can be further processed as described below.

In a preferred embodiment, the product mixture of step 3 is subjected to a postcondensation in step 4 at temperatures from about 200 to about 350° C., preferably at temperatures of about 220 to 300° C., especially from about 250 to 270° C. Step 4 is carried out at a pressure which is below the pressure of step 3 and would preferably be within the range from about 5 to $1000 \times 10^3$ Pa, more preferably within the range from about 10 to about $300 \times 10^3$ Pa. In the context of this step, the temperature and pressure are selected so as to obtain a second gas phase and a second liquid or solid phase or a mixture of second liquid and second solid phase which each comprise the polyamide.

The postcondensation of step 4 is preferably carried out in such a way that the relative viscosity (measured at a temperature of 25° C. and a concentration of 1 g of polymer per 100 ml in 96% strength by weight of sulfuric acid) of the polyamide assume a value within the range of about 1.6 to about 3.5.

In a preferred embodiment, any water present in the liquid phase can be expelled by means of an inert gas such as nitrogen.

The residence time of the reaction mixture in step 4 depends especially on the desired relative viscosity, the temperature, the pressure and the amount of water added in step 3.

If step 3 is operated as a single-phase regime, the product line between step 3 and step 4 may optionally contain packing elements, for example Raschig rings or Sulzer mixing elements, which allow a controlled expansion of the reaction mixture in the gas phase.

In a further embodiment of the invention, step 3 may be dispensed with and the polyamide is prepared by carrying out steps (1), (2) and (4).

This variant is preferably carried out as follows:

In step 1, at least one aminoalkyl nitrile is heated with an excess of water at a temperature within the range from about 250 to about 350° C., more preferably from about 270 to 300° C., and a pressure of from about 4 to $30 \times 10^6$ Pa, more preferably from about 6 to $30 \times 10^6$ Pa, in particular from 7 to $13 \times 10^6$ Pa and particularly preferably from about 8 to $12 \times 10^6$ Pa, the pressure and temperature being adjusted to each other in such a way that the synthesis mixture is present as a single liquid phase and the nitrile group conversion being not less than 95 mol %, more preferably within the range from 97 to 99 mol %, based on the moles of aminoalkyl nitrile used, to obtain a reaction mixture.

The reaction mixture is treated in step 2 at a temperature within the range from about 220 to about 300° C., more preferably from about 250 to 270° C., and a pressure within the range from about 1 to about $7 \times 10^6$ Pa, more preferably from about 1 to about $4 \times 10^6$ Pa, the pressure in step 2 being at least $0.5 \times 10^6$ Pa lower than in step 1. At the same time, the resulting first gas phase is separated from the first liquid phase.

The first liquid phase obtained in step 2 is treated in step 3 at a temperature within the range from about 220 to 300° C., more preferably from about 250 to 270° C., and a pressure within the range from about 10 to about $300 \times 10^3$ Pa, more preferably at about atmospheric pressure, the resulting second, water- and ammonia-comprising gas phase being separated from the second liquid phase. Within this step, the relative viscosity (measured as defined above) of the resulting polyamide is adjusted to a desired value within the range from about 1.6 to about 3.5 through choice of temperature and residence time.

The resulting second liquid phase is then conventionally discharged and, if desired, worked up.

The above-described processes, i.e., the sequence according to the invention of steps (1) to (3) or (1), (2) and (4) or (1) to (4), can be carried out batchwise, i.e., in succession in a single reactor, or continuously, i.e., simultaneously in successive reactors. It is also possible, of course, to carry out some of these steps, for example steps (1) and (2), continuously and the remaining step(s) batchwise.

In a further preferred embodiment of the present invention, at least one of the gas phases obtained in the respective steps can be recycled into at least one of the preceding steps.

It is further preferable to select the temperature and the pressure in step 1 or in step 3 or in both step 1 and step 3 so as to obtain a liquid or a solid phase or a mixture of liquid and solid phase and a gaseous phase and to separate off the gaseous phase.

Furthermore, in the context of the process of the invention, it is also possible to carry out a chain lengthening or branching or a combination thereof. For this purpose, polymer branching or chain-lengthening substances known to a person skilled in the art are added in the individual steps. These substances are preferably added in step 3 or 4.

Usable substances are:

Trifunctional amines or carboxylic acids as crosslinkers. Examples of suitable at least trifunctional amines or carboxylic acids are described in EP-A-0 345 648. The at least trifunctional amines have at least three amino groups which are capable of reaction with carboxylic acid groups. They preferably do not have any carboxylic acid groups. The at least trifunctional carboxylic acids have at least three carboxylic acid groups which are capable of reaction with amines and which can also be present, for example, in the form of their derivatives, such as esters. The carboxylic acids preferably do not contain any amino groups capable of reaction with carboxylic acid groups. Examples of suitable carboxylic acids are trimesic acid, trimerized fatty acids, prepared for example from oleic acid and having from 50 to 60 carbon atoms, naphthalenepolycarboxylic acids, such as naphthalene-1,3,5,7-tetracarboxylic acid. The carboxylic acids are preferably defined organic compounds and not polymeric compounds.

Examples of amines having at least 3 amino groups are nitrilotrialkylamine, especially nitrilotriethaneamine, dialkylenetriamines, especially diethylenetriamine, trialkylenetetramines and tetraalkylenepentamines, the alkylene moieties preferably being ethylene moieties. Furthermore, dendrimers can be used as amines. Dendrimers preferably have the general formula I

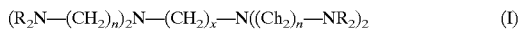
$$(R_2N-(CH_2)_n)_2N-(CH_2)_x-N((Ch_2)_n-NR_2)_2 \qquad (I)$$

where

R is H or $-(CH_2)_n-NR^1{}_2$, where $R^1$ is H or $-(CH_2)_n-NR^2{}_2$, where $R^2$ is H or $-(CH_2)_n-NR^3{}_2$, where $R^3$ is H or $-(CH_2)_n-NH_2$, n is an integer from 2 to 6, and x is an integer from 2 to 14.

Preferably, n is 3 or 4, especially 3, and x is an integer from 2 to 6, preferably from 2 to 4, especially 2. The radicals R can also have the stated meanings independently of one another. Preferably, R is a hydrogen atom or a $-(CH_2)_n-NH_2$ radical.

Suitable carboxylic acids are those having from 3 to 10 carboxylic acid groups, preferably 3 or 4 carboxylic acid groups. Preferred carboxylic acids are those having aromatic and/or heterocyclic nuclei. Examples are benzyl, naphthyl, anthracene, biphenyl, triphenyl radicals or heterocycles such as pyridine, bipyridine, pyrrole, indole, furan, thiophene, purine, quinoline, phenanthrene, porphyrin, phthalocyanine, naphthalo-cyanine. Preference is given to 3,5,3',5'-biphenyltetracarboxylic acid, phthalocyanine, naphthalocyanine, 3,5,3',5'-biphenyltetracarboxylic acid, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridinetetracarboxylic acid, particularly preferably 1,3,5-benzenetricarboxylic acid (trimesic acid) and 1,2,4,5-benzenetetracarboxylic acid. Such compounds are commercially available or can be prepared by the process described in DE-A-4 312 182. If ortho-substituted aromatic compounds are used, imide formation is preferably prevented through the choice of suitable reaction temperatures.

These substances are at least trifunctional, preferably at least tetrafunctional. The number of functional groups can be from 3 to 16, preferably from 4 to 10, particularly preferably from 4 to 8. The processes of the invention are carried out using either at least trifunctional amines or at least trifunctional carboxylic acids, but not mixtures of such amines or carboxylic acids. However, small amounts of at least trifunctional amines may be present in the trifunctional carboxylic acids, and vice versa.

The substances are present in an amount from 1 to 50 $\mu$mol/g of polyamide, preferably from 1 to 35, particularly preferably 1 to 20, $\mu$mol/g of polyamide. The substances are preferably present in an amount from 3 to 150, particularly preferably from 5 to 100, especially from 10 to 70, $\mu$mol of equivalents/g of polyamide. The equivalents are based on the number of functional amino groups or carboxylic acid groups.

Difunctional carboxylic acids or difunctional amines as chain lengtheners. These have 2 carboxylic acid groups which can be reacted with amino groups, or 2 amino groups which can be reacted with carboxylic acids. The difunctional carboxylic acids or amines, as well as the carboxylic acid groups or amino groups, do not contain any further functional groups capable of reaction with amino groups or carboxylic acid groups. Preferably, they do not contain any further functional groups. Examples of suitable difunctional amines are those which form salts with difunctional carboxylic acids. They can be linear aliphatic, such as $C_{1-14}$-alkylenediamine, preferably $C_{2-6}$-alkylenediamine, for example hexylenediamine. They can also be cycloaliphatic. Examples are isophoronediamine, dicycycan, laromine. Branched aliphatic diamines are likewise usable, an example being Vestamin TMD (trimethylhexamethylenediamine, from Hüls AG). In addition, the diamines can also be aromatic-aliphatic, it being possible to use n-xylylenediamine for example. Entire amines can each be substituted by $C_{1-12}$-alkyl, preferably $C_{1-14}$-alkyl, radicals on the carbon skeleton.

Difunctional carboxylic acids are for example those which form salts with difunctional diamines. They can be linear aliphatic dicarboxylic acids, which are preferably $C_{4-20}$-dicarboxylic acids. Examples are adipic acid, azelaic acid, sebacic acid, suberic acid. They can also be aromatic. Examples are isophthalic acid, terephthalic acid, naphthalenedicarboxylic acid, as well as dimerized fatty acids.

The difunctional basic building blocks (c) are preferably used in amounts from 1 to 55, particularly preferably from 1 to 30, especially from 1 to 15, $\mu$m/g of polyamide.

According to the invention, the product mixture obtained in step 3, or the second liquid or second solid phase or the mixture of second liquid and second solid phase (from step 4) which each comprise the polyamide, preferably a polymer melt, is discharged from the reaction vessel in a conventional manner, for example by means of a pump. Subsequently, the polyamide obtained can be worked up according to conventional methods, as described for example in DE-A 43 21 683 (page 3 line 54 to page 4 line 3) at length.

In a preferred embodiment, the level of cyclic dimer in the nylon-6 obtained according to the invention can be further reduced by extracting the polyamide first with an aqueous solution of caprolactam and then with water and/or subjecting it to a gas phase extraction (described in EP-A 28 49 68, for example). The low molecular weight constituents obtained in this aftertreatment, such as caprolactam, linear caprolactam oligomer and cyclic caprolactam oligomer, can be recycled into the first and/or second and/or third step.

The starting monomer or monomer mixture can be admixed in all steps, preferably in the fourth step, with customary additives and fillers such as pigments, especially titanium dioxide (anatase and/or rutile), silicon dioxide and talcum, chain regulators such as aliphatic and aromatic carboxylic and dicarboxylic acids such as propionic acid, acetic acid, benzoic acid, terephthalic acid and also triacetonediamine, stabilizers such as copper(I) halides and alkali metal halides, nucleating agents such as magnesium silicate or boron nitride, catalysts such as phosphorous acid and also antioxidants in amounts within the range from 0.01 to 5, preferably within the range from 0.2 to 2, % by weight, based on the amount of monomers used.

The present invention further relates to a polyamide preparable by (1) reacting at least one aminonitrile with water at a temperature from 100 to 360° C. and a pressure from 0.1 to 35×10⁶ Pa to obtain a reaction mixture, (2) further reacting the reaction mixture at a temperature from 150 to 400° C. and a pressure which is lower than the pressure in step 1, the temperature and the pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and (3) admixing the first liquid or the first solid phase or the mixture of first liquid and first solid phase with a gaseous or liquid phase comprising water at a temperature from 150 to 360° C. and a pressure from 0.1 to 30×10⁶ Pa to obtain a product mixture, a polyamide preparable by (1) reacting at least one aminonitrile with water at a temperature from 100 to 360° C. and a pressure from 0.1 to 35×10⁶ Pa to obtain a reaction mixture, (2) further reacting the reaction mixture at a temperature from 150 to 400° C. and a pressure which is lower than the pressure in step 1, the temperature and the pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and (3) admixing the first liquid or the first solid phase or the mixture of first liquid and first solid phase with a gaseous or liquid phase comprising water at a temperature from 150 to 360° C. and a pressure from 0.1 to 30×10⁶ Pa to obtain a product mixture, (4) postcondensing the product mixture at a temperature from 200 to 350° C. and a pressure which is lower than the pressure of step 3, the temperature and pressure being selected so as to obtain a second, water- and ammonia-comprising gas phase and a second liquid or second solid phase or a mixture of second liquid and second solid phase, which each comprise the polyamide, and a polyamide preparable by (1) reacting at least one aminonitrile with water at a temperature from 100 to 360° C. and a pressure from 0.1 to $35 \times 10^6$ Pa to obtain a reaction mixture, (2) further reacting the reaction mixture at a temperature from 150 to 400° C. and a pressure which is lower than the pressure in step 1, the temperature and the pressure being selected so as to obtain a first gas phase and a first liquid or a first solid phase or a mixture of first solid and first liquid phase, and the first gas phase is separated from the first liquid or the first solid phase or from the mixture of first liquid and first solid phase, and (4) postcondensing the first liquid or first solid phase or the mixture of first liquid and first solid phase at a temperature from 200 to 350° C. and a pressure which is lower than the pressure of step 3, the temperature and pressure being selected so as to obtain a second, water- and ammonia-comprising gas phase and a second liquid or second solid phase or a mixture of second liquid and second solid phase, which each comprise the polyamide.

The polyamides of or obtained according to this invention, especially nylon-6 and its copolymers, can be used for manufacturing fibers and materials of construction.

MODE(S) FOR CARRYING OUT THE INVENTION

EXAMPLES

Example 1

This example illustrates the present invention using the reaction of ACN.

The AEG (amino end group) and CEG (carboxyl end group) are determined by the method described in WO 95/01389 (page 6 line 35 to page 7 line 40).

The volatile bases are determined by the method of Parnas-Wagner by hydrolyzing the polyamide with HCl, liberating the bases with NaOH, then steam distilling the liberated bases by the method of Parnas into a flask containing HCl and finally back-titrating the excess HCl with NaOH. The difference between HCl used in the receiving flask and back-titrated HCl can be used to calculate the level of volatile bases (in mg of $NH_3$/kg).

The nitrile group conversion was determined by FTIR spectroscopy by means of the characteristic CN group band at 2247 $cm^{-1}$.

The relative viscosity (RV) was determined at 25° C. and a concentration of 1 g of polymer per 100 ml in 96% strength by weight sulfuric acid.

In all the runs listed, the step 4 postcondensation was carried out batchwise in a laboratory autoclave: 3 h, 250° C., $10^5$ Pa (1 bar).

The results and experimental conditions are shown in Table 1.

Example 2

The table below shows the experimental conditions in steps 1 and 2. The temperature in step 4 was 270° C., the pressure was 105 Pa (1 bar) and the residence time was 1.5 h.

| | Step 1 | | | | Step 2 | | | | Volatile bases [mg of $NH_3$/kg] |
|---|---|---|---|---|---|---|---|---|---|
| ACN/$H_2O$ [mol] | Time [min] | T [° C.] | p [bar] | ACN conversion [%] | Time [min] | T [° C.] | p [bar] | RV | |
| 1:6 | 200 | 250 | 90 | 97 | 240 | 252 | 36 | 2.14 | 240 |

AEG: 65 mmol/kg

CEG: 55 mmol/kg

AEG/CEG=1.18

TABLE 1

| Step 1 | | | | Step 2 | | | | Step 3 | | | | RV | CEG [meq/kg] | Polyamide vol. bases [mg $NH_3$/kg] |
|---|---|---|---|---|---|---|---|---|---|---|---|---|---|---|
| ACN:$H_2O$ [molar] | RT [min] | T [° C.] | P [bar] | RT [min] | T [° C.] | P [bar] | WA [%] | P [bar] | T [° C.] | RT [min] | | | | |
| 1:3 | 180 | 252 | 90 | 100 | 254 | 40 | 30 | 44 | 250 | 300 | 2.06 | 70.6 | 110 | |
| 1:3 | 180 | 252 | 90 | 100 | 254 | 36 | 60 | 40 | 250 | 300 | 2.07 | 74.6 | 100 | |
| 1:2 | 180 | 252 | 90 | 100 | 252 | 36.5 | 10 | 40 | 246 | 300 | 2.16 | 56.9 | 480 | |
| 1:2 | 180 | 261 | 88 | 100 | 252 | 26 | 30 | 30 | 261 | 300 | 2.26 | 65.4 | 245 | |
| 1:2 | 360 | 260 | 86 | 200 | 251 | 22 | 60 | 30 | 254 | 600 | 2.01 | 88.1 | 96 | |
| 1:2 | 360 | 260 | 87 | 200 | 251 | 21 | 30 | 28 | 255 | 600 | 2.01 | 90 | 160 | |

RT = residence time
WA = water add in %, based on feed stream of ACN/water mixture in step 1

Comparative Examples

The table below shows the parameters of products prepared according to the prior art—Example 1 of U.S. Pat. No. 5,109,104 and Example 1 of U.S. Pat. No. 2,245,129.

|  | RV | CEG [meq/kg] | Vol. bases [mg of $NH_3$/kg] |
|---|---|---|---|
| US 5 109 104 | 1.76 | 19 | 1910 |
| US 2 245 129 | 1.82 | 10 | 3150 |

We claim:

1. A process for preparing a polyamide by reaction of at least one aminonitrile with water, which comprises:
   (1) preparing a reaction mixture by reacting at least one aminonitrile with water in a molar ratio of from 1:1 to 1:30 at a temperature of from 100 to 360° C. and a pressure of from 4 to $30 \times 10^6$ Pa,
   (2) subsequently reacting the reaction mixture obtained in step (1) at a temperature of from 150 to 400° C. and a pressure which is lower than the pressure in step (1), whereby the temperature and the pressure are adapted so that
      $a_2$) a first gas phase, and
      $b_2$) a first liquid or a first solid phase or a mixture of first solid and first liquid phase is formed, and separating the first gas phase ($a_2$) from the first liquid and/or solid phase ($b_2$), and
   (3) preparing the polyamide by reacting the separated first liquid and/or solid phase ($b_2$) with a gaseous or liquid phase comprising water at a temperature of from 150 to 360° C. and a pressure of from 0.1 to $30 \times 10^6$ Pa.

2. A process for preparing a polyamide by reaction of at least one aminonitrile with water, which comprises:
   (1) preparing a first reaction mixture by reacting at least one aminonitrile with water in a molar ratio of from 1:1 to 1:30 at a temperature of from 100 to 360° C. and a pressure of from 4 to $30 \times 10^6$ Pa,
   (2) subsequently reacting the first reaction mixture at a temperature of from 150 to 400° C. and a pressure which is lower than the pressure in step (1), whereby the temperature and the pressure are adapted so that
      $a_2$) a first gas phase, and
      $b_2$) a first liquid or a first solid phase or a mixture of first solid and first liquid phase is formed, and separating the first gas phase ($a_2$) from the first liquid and/or solid phase ($b_2$),
   (3) preparing a second reaction mixture by reacting the first liquid and/or solid phase ($b_2$) with a gaseous or liquid phase comprising water at a temperature of from 150 to 360° C. and a pressure of from 0.1 to $30 \times 10^6$ Pa, and
   (4) preparing the polyamide by reacting the second reaction mixture at a temperature of from 200 to 350° C. and a pressure which is lower than the pressure of step (3), whereby the temperature and pressure are adapted so that
      $a_4$) a second, water- and ammonia-comprising gas phase, and
      $b_4$) a second liquid or second solid phase or a mixture of second liquid and second solid phase is formed, wherein each of the phases ($a_4$) and ($b_4$) comprises the polyamide.

3. A process for preparing a polyamide by reaction of at least one aminonitrile with water, which comprises:
   (1) preparing a reaction mixture by reacting at least one aminonitrile with water in a molar ratio of from 1:1 to 1:30 at a temperature of from 100 to 360° C. and a pressure of from 4 to $30 \times 10^6$ Pa,
   (2) subsequently reacting the reaction mixture obtained in step (1) at a temperature of from 150 to 400° C. and a pressure which is lower than the pressure in step (1), whereby the temperature and the pressure are adapted so that
      $a_2$) a first gas phase, and
      $b_2$) a first liquid or a first solid phase or a mixture of first solid and first liquid phase is formed, and separating the first gas phase ($a_2$) from the first liquid and/or solid phase ($b_2$), and
   (4) preparing the polyamide by reacting the first liquid and/or solid phase ($b_2$) at a temperature from 200 to 350° C., whereby the temperature and pressure are adapted so that
      $a_4$) a second, water- and ammonia-comprising gas phase, and
      $b_4$) a second liquid or second solid phase or a mixture of second liquid and second solid phase is formed, wherein each of the phases ($a_4$) and ($b_4$) comprises the polyamide.

4. The process defined in claim 1, wherein the temperature and pressure in step (1) or in step (3) are adapted so that
   a gaseous phase ($a_1$) or ($a_3$), and
   a liquid or a solid phase or a mixture of liquid and solid phase ($b_1$) or ($b_3$) are formed, and the gaseous phase ($a_1$) or ($a_3$) is separated off and the liquid and/or solid phase ($b_1$) is utilized as the reaction mixture introduced into step (2).

5. The process defined in claim 1, wherein the reaction of step (1) is carried out until a conversion of nitrile groups of at least 95 mol %, based on the moles of aminonitrile, is reached.

6. The process defined in claim 1, wherein, in step (3), the gaseous or liquid phase comprising water is added in an amount of from 50 to 1500 ml of water per 1 kg of the first liquid and/or solid phase ($b_2$).

7. The process defined in claim 1, wherein steps (1) to (3) are carried out continuously.

8. The process defined in claim 1, wherein the gaseous phase ($a_2$) is recycled into the preceding step.

9. The process defined in claim 1, wherein the aminonitrile is an ω-aminoalkyl nitrile having an alkylene moiety ($-CH_2-$) of from 4 to 12 carbon atoms, or is an aminoalkylaryl nitrile having from 1 to 13 carbon atoms.

10. The process defined in claim 1, wherein the aminonitrile is a mixture consisting of:
    from 50 to 99.99% by weight of 6-aminocapronitrile,
    from 0.01 to 50% by weight of at least one dicarboxylic acid selected from the group consisting of aliphatic $C_1$–$C_{10}$-α,ω-dicarboxylic acids, aromatic $C_8$–$C_{12}$-dicarboxylic acids and $C_5$–$C_8$-cycloalkanedicarboxlylic acids,
    from 0 to 50% by weight of an α,ω-diamine having 4–10 carbon atoms,
    from 0 to 50% by weight of an α,ω-$C_2$–$C_{12}$-dinitrile, and
    from 0 to 50% by weight of an α,ω-amino acid or the corresponding lactam,
    the individual weight percentages adding up to 100%.

11. The process defined in claim 1, wherein step (3) comprises reacting the separated phase ($b_2$) in the presence of a polymer branching or chain-lengthening compound.

12. A polyamide obtained by a process as claimed in claim 1.

13. The process defined in claim 1, wherein the temperature and pressure in step (1) and in step (3) are adapted so that a gaseous phase ($a_1$) and ($a_3$), and a liquid or a solid phase or a mixture of liquid and solid phase ($b_1$) and ($b_3$) are formed, and the gaseous phase ($a_1$) and ($a_3$) are separated off, and the liquid and/or solid phase ($b_1$) is utilized as the reaction mixture introduced into step (2).

14. The process defined in claim 1, wherein the pressure in step (2) is at least $0.5 \times 10^6$ Pa lower than the pressure in step (1).

15. The process defined in claim 1, wherein the pressure in step (2) is from 0.5 to $15 \times 10^6$ Pa.

16. The process defined in claim 1, wherein the pressure in step (2) is from 0.5 to $5 \times 10^6$ Pa.

17. The process defined in claim 2, wherein the reaction of step (1) is carried out until a conversion of nitrile groups of at least 95 mol %, based on the moles of aminonitrile, is reached.

18. The process defined in claim 2, wherein, in step (3), the gaseous or liquid phase comprising water is added in an amount of from 50 to 1500 ml of water per 1 kg of the first liquid and/or solid phase ($b_2$).

19. The process defined in claim 2, wherein steps (1) to (3) are carried out continuously.

20. The process defined in claim 2, wherein the pressure in step (2) is at least $0.5 \times 10^6$ Pa lower than the pressure in step (1).

21. The process defined in claim 2, wherein the pressure in step (2) is from 0.5 to $15 \times 10^6$ Pa.

22. The process defined in claim 2, wherein the pressure in step (2) is from 0.5 to $5 \times 10^6$ Pa.

23. The process defined in claim 3, wherein the reaction of step (1) is carried out until a conversion of nitrile groups of at least 95 mol %, based on the moles of aminonitrile, is reached.

24. The process defined in claim 3, wherein the pressure in step (2) is at least $0.5 \times 10^6$ Pa lower than the pressure in step (1).

25. The process defined in claim 3, wherein the pressure in step (2) is from 0.5 to $15 \times 10^6$ Pa.

26. The process defined in claim 3, wherein the pressure in step (2) is from 0.5 to $5 \times 10^6$ Pa.

* * * * *